United States Patent [19]
Jhon et al.

[11] Patent Number: 5,761,724
[45] Date of Patent: Jun. 2, 1998

[54] WRITE-INVALIDATE CACHE SYSTEM FOR A SPLIT TRANSACTION BUS BASED SHARED MEMORY MULTIPROCESSOR

[75] Inventors: Chu-Shik Jhon; Seong-Tae Jhang, both of Seoul, Rep. of Korea

[73] Assignee: Samsung Electronics Co., Ltd., Suwon, Rep. of Korea

[21] Appl. No.: 768,592

[22] Filed: Dec. 18, 1996

Related U.S. Application Data

[63] Continuation-in-part of Ser. No. 186,931, Jan. 27, 1994, abandoned.

Foreign Application Priority Data

Jan. 30, 1993 [KR] Rep. of Korea .......... 93-1201
Jan. 21, 1994 [JP] Japan .................. 94-1080

[51] Int. Cl.$^6$ .......................................... G06F 12/02
[52] U.S. Cl. .................. 711/144; 711/121; 711/145
[58] Field of Search ........................ 711/121, 122, 711/143, 144, 145, 146, 148

[56] References Cited

U.S. PATENT DOCUMENTS

| | | | |
|---|---|---|---|
| 4,755,930 | 7/1988 | Wilson, Jr. et al. | 711/122 |
| 5,197,146 | 3/1993 | LaFetra | 711/144 |
| 5,226,144 | 7/1993 | Moriwaki et al. | 711/121 |
| 5,251,308 | 10/1993 | Frank et al. | 711/163 |
| 5,263,144 | 11/1993 | Zurawski et al. | 711/121 |
| 5,265,232 | 11/1993 | Gannon et al. | 711/124 |
| 5,269,013 | 12/1993 | Abramson et al. | 711/170 |
| 5,274,787 | 12/1993 | Hirano et al. | 711/143 |
| 5,303,362 | 4/1994 | Butts, Jr. et al. | 711/121 |
| 5,317,716 | 5/1994 | Liu | 711/144 |

*Primary Examiner*—Eddie P. Chan
*Assistant Examiner*—Hiep T. Nguyen
*Attorney, Agent, or Firm*—IP Group of Pillsbury Madison & Sutro LLP

[57] ABSTRACT

A shared memory multiprocessor comprises a system bus operating under a split transaction protocol, at least one memory module coupled to the system bus and plurality of processor modules respectively having a processor and a cache. The cache maintains state information for each data block stored therein, which includes two distinct invalidated cache block states of COPYBACK-INVALID and NON-COPYBACK-INVALID. COPYBACK-INVALID and NON-COPYBACK-INVALID states commonly denote that the data block has been invalidated by another processor module in the shared memory multiprocessor. However, unlike COPYBACK-INVALID state, NON-COPYBACK-INVALID state further denotes that the processor module which most recently invalidated the data block has not copied back its updated copy of the block to the memory module, and, accordingly, the memory module does not contain the updated copy of the data block. Hence, upon an invalidation miss for a data block in a processor module, when the data block is in NON-COPYBACK-INVALID state as indicated by the state information of the data block, the processor module sends a read (with invalidation) request to other processor modules only, excluding the memory module from the read (with invalidation) request transaction.

17 Claims, 6 Drawing Sheets

WRITE-INVALIDATE CACHE SYSTEM FOR A SPLIT TRANSACTION BUS BASED SHARED MEMORY MULTIPROCESSOR

CROSS REFERENCE TO RELATED APPLICATION

This application is a continuation-in-part of U.S. Ser. No. 08/186,931 filed on Jan. 27, 1994 now abandoned.

FIELD OF THE INVENTION

The present invention relates to a multiprocessor; and, more particularly, to an improved write-invalidate cache system for a split transaction bus based shared memory multiprocessor.

DESCRIPTION OF THE PRIOR ART

Multiprocessing is a technique commonly used to increase a system computing power beyond the limit of current uniprocessor technology. In a multiprocessor, multiple instruction streams are executed in parallel, and both communication and synchronization between processor modules are accomplished by passing messages or sharing memory modules.

Figure 1:
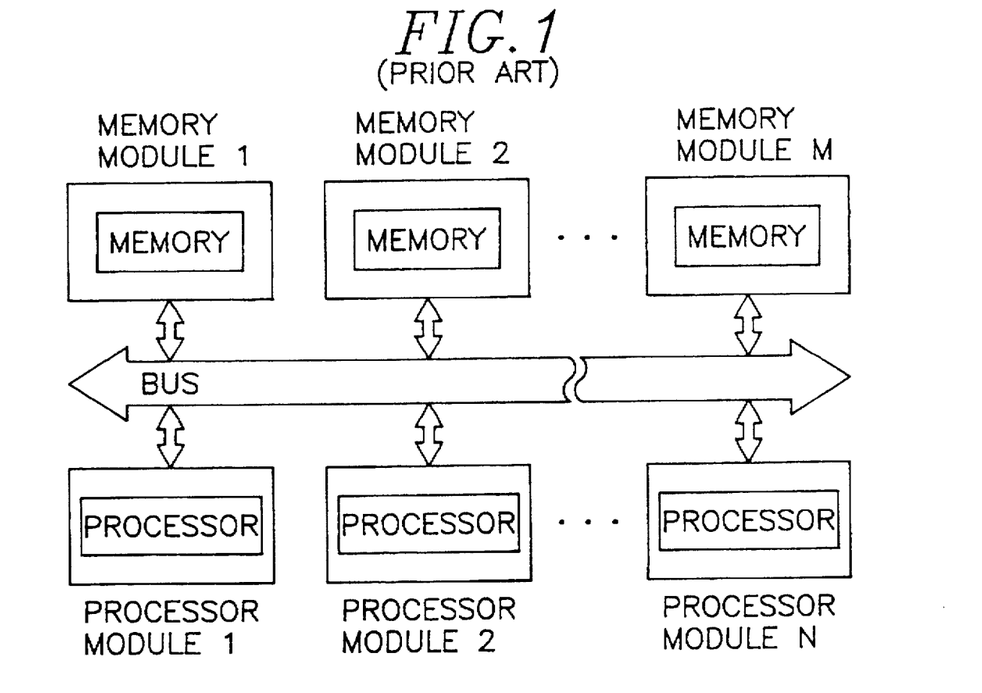
FIG. 1 shows a typical shared memory multiprocessor.

Shared memory multiprocessors have emerged as a cost effective means to provide increased computing power, mainly because they use low-cost microprocessors economically interconnected with shared memory modules. FIG. 1 shows a typical shared memory multiprocessor consisting of processor modules connected with shared memory modules by a common bus.

Such a system, however, suffers from, among other things, two problems: that is, the problem of bus contention which occurs when several processor modules attempt to access the common bus simultaneously, and that of memory contention which arises when several processor modules attempt to access a memory module simultaneously. These problems all contribute to increased memory access time and, hence, slow down the multiprocessor execution speed.

To alleviate the bus contention problem, it has been proposed to increase the bandwidth of the common bus. Among the known buses, the so-called split transaction bus is known to have an increased bandwidth without incurring substantial hardware complexity. The bus uses a split transaction protocol, which releases the bus between an access request and its corresponding response. This allows the bus to be available for other transactions during an otherwise idle period. A more detailed description of the split transaction bus can be found in, e.g., U.S. Pat. No. 5,067,071 issued to D. J. Schanin et al.

However, even if the common bus has an increased bandwidth, since a memory module can handle only one memory request at a time, performance degradation occurs when several processor modules attempt to access the memory module simultaneously. Therefore, it still is important to reduce the processor module-memory module traffic as much as possible.

Figure 2:
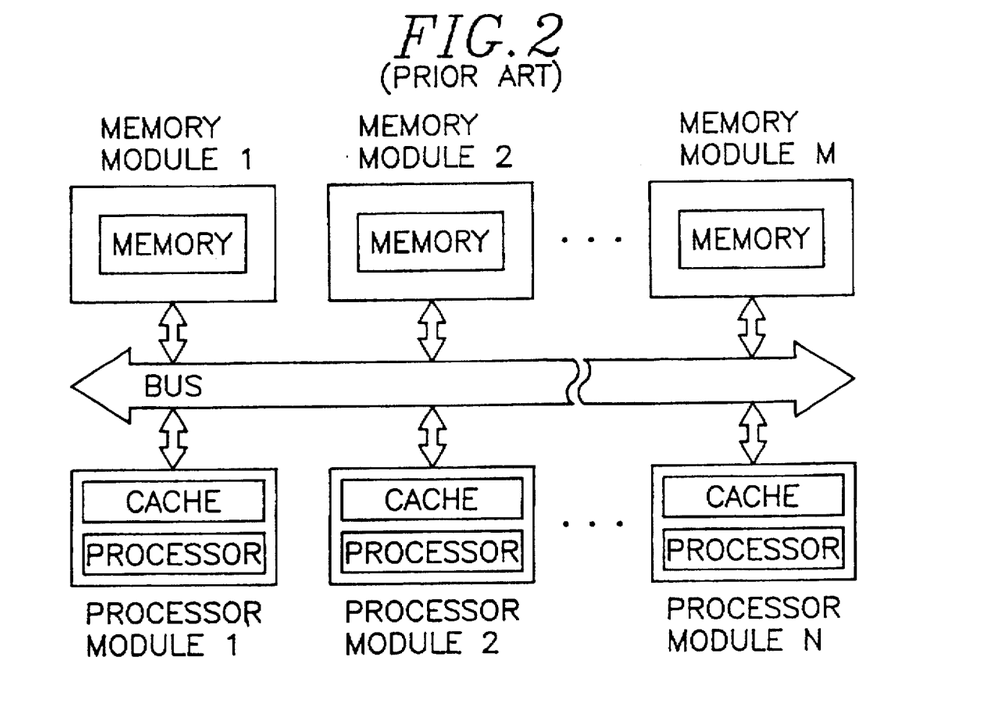
FIG. 2 represents a typical shared memory multiprocessor with a private cache included in each processor module.

Cache memories have been employed successfully in reducing the processor-memory traffic in uniprocessors. The locality of memory references over time (temporal locality) and space (spatial locality) allows a cache memory to perform a vast majority of memory requests (typically more than 95 percent); while a system memory handles only a small fraction. It is, therefore, not surprising that multiprocessor architects also have employed cache technique to address the bus contention and the memory contention problems discussed above. FIG. 2 shows a multiprocessor organization with caches attached to all processor modules. This cache is often called private, as opposed to shared, because each cache is private to one processor module. Hereinafter, we shall refer to a processor module as a hardware module which contains a processor with an attached private cache.

However, the use of a private cache in each processor module entails the so-called cache coherence problem: that is, a write to a block in the private cache of a processor module must be reflected into the contents of all the corresponding blocks that reside in the private caches of other processor modules. Many different cache coherence schemes, therefore, have been developed to reduce a processor module's bus and memory requests while solving cache coherence problem. One of the widely accepted schemes is a write-invalidate cache coherence scheme.

In the write-invalidate cache coherence scheme, the private cache in each processor module in a shared memory multiprocessor maintains, for each block stored therein, the state information which indicates current state of the cache block among at least three possible cache block states: MODIFIED, INVALID and SHARED. MODIFIED state indicates that the block has been modified in the private cache, but the corresponding memory module has not been modified. When the block in MODIFIED state is to be replaced with another block according to a block replacement process which will be explained later, it must be copied back to the corresponding memory module. INVALID state denotes that the block has been invalidated by another processor module in a shared memory multiprocessor. SHARED state represents that the block has been neither modified locally nor invalidated by another processor module, and is consistent with the block stored in the corresponding memory module. Generally, the scheme, upon a read/write request for a block from a processor within a processor module, works as follows:

Read-hit—Read-hit represents the case where the private cache within the processor module has the read-requested block in either MODIFIED or SHARED state. In this case, the private cache supplies the requested block to the processor.

Read-miss—Read-miss represents the case where the private cache within the processor module does not have the read-requested block (a cache miss), or it has the read-requested block in INVALID state (an invalidation miss). In this case, the processor module sends a broadcast read request to memory modules and other processor modules. If one of the other processor modules has the block in MODIFIED state, it responds to the read request with its copy of the block. Otherwise, the memory module which contains the block responds to read request with its copy of the block. The requesting processor module then changes the state of the block to SHARED.

Write-hit—Write-hit represents the case where the private cache within the processor module has the write-requested block either in MODIFIED or SHARED state. If the private cache has the block in MODIFIED state, the processor module performs the write operation for the block. If the private cache has the block in SHARED state, the processor modules, causing all other processor modules to invalidate their copies of the block, and performs the write operation for the block, and then changes the state of the block into MODIFIED one.

Write-miss—Write-miss represents the case where the private cache within the processor module does not have the write-requested block (a cache miss), or it has the write-requested block in INVALID state (an invalidation miss). In this case, the processor module sends a broadcast read with invalidation request to the memory module and other processor modules, causing all other processor modules which has the block in MODIFIED state in its private cache to respond to the request with its copy of the block. If no other processor module has the block in MODIFIED state, then the memory module which contains the block responds to the request with its copy of the block. The requesting processor module then changes the state of the block to MODIFIED one and completes the write operation for the block.

Several variations of the above write-invalidate cache coherence scheme can be found in, e.g., Per Stenstrom, "A Survey of Cache Coherence Schemes for Multiprocessors", *IEEE Computer*, June 1990, pp. 12–24; Paramarcos, M. and Patel, J., "A Low Overhead Coherence Solution for Multiprocessors with Private Cache Memories", 11*th ISCA*, 1984, pp. 384–354; R. H. Katz et al., "Implementing A Cache Consistency Protocol", 12*th ISCA*, 1985, pp. 276–283; and Tom Lovett and Shreekannt Thakkar, "The Symmetry Multiprocessor System", 1988 *ICPP, I*, August 1988, pp. 303–310.

While such conventional write-invalidate cache coherence schemes work efficiently under the non-split transaction bus based multiprocessor environment, they reveal a number of deficiencies when employed in a split transaction bus based multiprocessor as illustrated below.

As discussed previously, in existing write-invalidate cache coherence schemes, whenever an invalidation miss occurs, the processor module sends a broadcast read (with invalidation) request to memory modules and other processor modules. Further, the split transaction protocol releases the bus between an access request and its corresponding response, allowing the bus to be used for other requests during the period.

Figure 3:
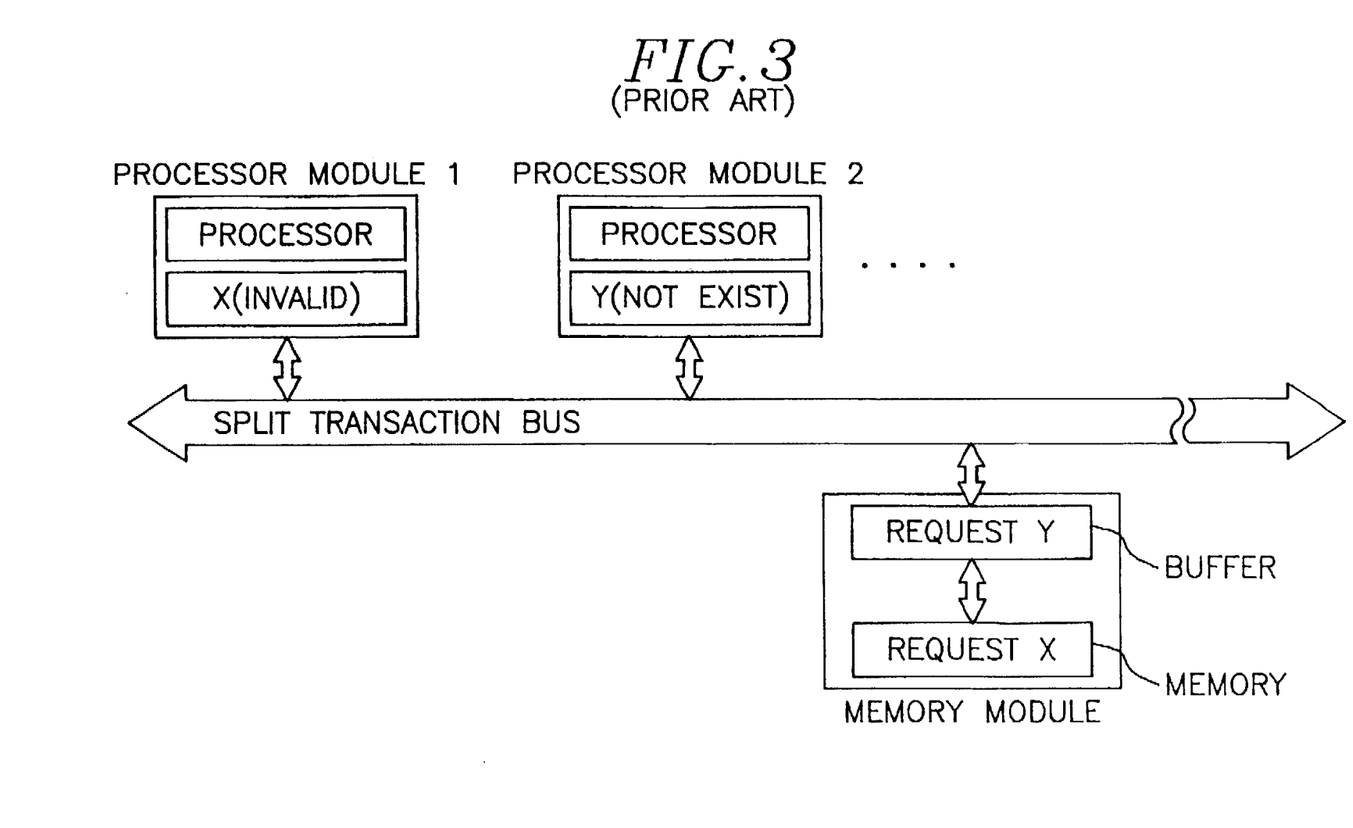
FIG. 3 depicts a conventional shared memory multiprocessor, illustrating the problems in existing write-invalidate cache coherence schemes under a split transaction bus-based multiprocessor environment.

Under this situation, when, as shown in FIG. 3, an invalidation miss occurs for block X in processor module 1 and then a cache miss occurs for block Y in processor module 1, (assuming that there is only one memory module with one request buffer connected to the split transaction bus), processor module 1 sends a broadcast read (with invalidation) request for block Y to the memory module and other processor modules. As a result, the memory module starts responding to the first read request (i.e., the broadcast read (with invalidation) request for block X), but queues the second read request (i.e., the broadcast read (with invalidation) request for block Y) in the request buffer since the memory module can serve at most one memory access at a time. Therefore, the response to the second read request is delayed at least until the memory module completes the response to the first read request or stops the response as is informed, by a processor module which has block X in MODIFIED state (i.e., has an updated copy of block X), that the processor module will respond to the first read request with its copy of the block.

However, if it is known in advance that another processor module has block X in MODIFIED state, processor module 1 can send the first read request to other processor modules only (instead of sending also to the memory module), eliminating the unnecessary memory access. This allows the memory module to respond to the second read request without delay, to thereby reduce the multiprocessor's effective memory access time.

SUMMARY OF THE INVENTION

Accordingly, it is a primary object of the invention to provide a new and improved write-invalidate cache system for a split transaction bus based shared memory multiprocessor system, which reduces the effective memory access time while solving the cache coherence problem.

In accordance with the present invention, there is provided a shared memory multiprocessor having a system bus operating under a split transaction protocol, at least one memory module coupled to the system bus and a plurality of processor modules respectively including a processor and a cache. The cache maintains state information for each block stored therein, which includes two distinct invalidated cache block states of COPYBACK-INVALID and NON-COPYBACK-INVALID. COPYBACK-INVALID and NON-COPYBACK-INVALID states commonly denote that the block has been invalidated by another processor module in the shared memory multiprocessor. However, unlike COPYBACK-INVALID state, NON-COPYBACK-INVALID state further denotes that the processor module which most recently invalidated the block has not copied back its updated copy of the block to the memory module, and accordingly, the memory module does not contain the updated copy of the block. Hence, upon an invalidation miss for a block in a processor module, when the block is NON-COPYBACK-INVALID state as indicated by the state information of the block, the processor module sends a read (with invalidation) request to other processor modules only, excluding the memory module from the read (with invalidation) request transaction.

BRIEF DESCRIPTION OF THE DRAWINGS

The above and other objects and features of the present invention will become apparent from the following description of preferred embodiments taken in conjunction with the accompanying drawing, in which.

DETAILED DESCRIPTION OF THE PREFERRED EMBODIMENTS

Figure 4:
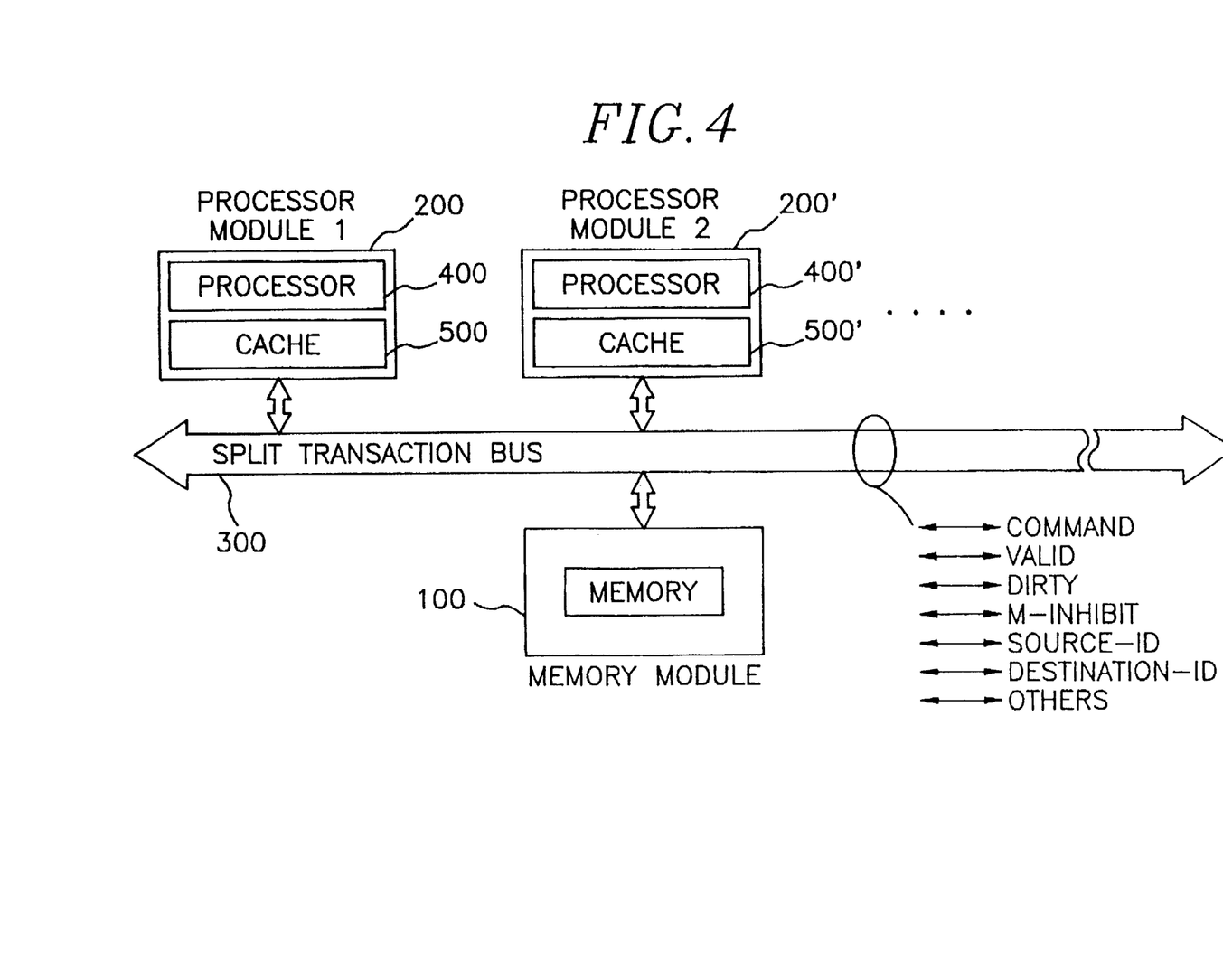
FIG. 4 illustrates a shared memory multiprocessor which incorporates the improved write-invalidate cache system of the present invention.

FIG. 4 illustrates a block diagram of a shared memory multiprocessor which incorporates the novel write-invalidate cache system of the present invention. As shown, the shared memory multiprocessor has at least one memory module 100 connected to at least two processors 200, 200' via a split transaction bus 300. Each processor module 200(200') comprises a processor 400(400') and a cache 500(500').

Within the memory module 100 and the caches 500, 500' data is decomposed into a number of equal-sized blocks. At the cache 500(500'), an access to a block commences with the arrival of the physical address of the block along with the access request thereof from the processor 400(400'). (As all of the caches, e.g., 500, 500', are identical, the description will be given with respect to the cache 500 only. Further, although, in the following description, the cache 500 is described as to use a direct mapping method, e.g., 2-way set-associative mapping method (a detailed description of the 2-way set-associative mapping method can be found in, e.g., Mano, M. M. Computer Engineering, Prentice-Hall, 1988) may be equally applied to the cache 500 of the present invention.)

A portion , e.g., the lower k bits, of the entire (e.g., n bits) physical address of the block is used to access the block in the cache 500 while the n-bit address is used to access the block in the memory module 100. The lower k bit portion is called a "block address" and the remaining higher (n–k) bit portion is called a "tag address". Each block in the cache 500 comprises data and its associated tag address. When a new block is first brought into the cache 500, the tag address is stored alongside the data. When the physical address for a block arrives at the cache 500, the block address portion of the physical address is then compared with the tag address of the block read from the cache 500. A match therebetween indicates that the cache 500 contains the block.

In addition, the cache 500 maintains state information for each block stored therein.

As explained above, in conventional write-invalidate cache coherence schemes, when an invalidation miss for a block occurs in a processor module, a read (with invalidation) request is sent to memory modules and other processor modules, which adversely affects the shared memory multiprocessor's performance. However, in accordance with the present invention, when it is known that another processor module has the block in MODIFIED state, and, accordingly, no memory module has an updated copy of the block, the read (with invalidation) request can be sent to other processor modules only; and, therefore, the memory modules can be excluded from the read (with invalidation) request transaction, eliminating unnecessary memory accesses, and, consequently, reducing effective memory access time.

However, to obtain such an improvement, the cache 500 of the present invention should maintain two distinct invalidated cache block states: NON-COPYBACK-INVALID and COPYBACK-INVALID.

NON-COPYBACK-INVALID and COPYBACK-INVALID states commonly denote that the block has been invalidated by another processor module in the shared memory multiprocessor. NON-COPYBACK-INVALID state further denotes that the processor module which most recently invalidated the block has not copied back its updated copy of the block to the memory module 100, and, accordingly, the memory module 100 does not contain the updated copy of the block, whereas COPYBACK-INVALID state denotes that the processor module has copied back its updated copy of the block to the memory module 100 according to a block replacement process which will be explained later, and, accordingly, the memory module 100 contains the updated copy of the block.

Further, in accordance with a preferred embodiment of the present invention, the cache 500 of the present invention may include five additional cache block states: MODIFIED-SHARED, MODIFIED, EXCLUSIVE, SHARED-SOURCE, SHARED, all implying a valid cache block state (i.e., the block has not been invalidated by another processor module in the shared memory multiprocessor.)

MODIFIED-SHARED and MODIFIED states denote that the block has been modified in the cache 500 (i.e., the cache 500 has an updated copy of the block), and is inconsistent with that in the memory module 100. MODIFIED state further denotes that no other processor module has the block in valid state.

EXCLUSIVE state denotes that the block is consistent with that in the memory module 100, and no other processor module has the block in valid state.

SHARED-SOURCE state denotes that the block is consistent with that in the memory module 100; and also denotes that, in the cache 500, there has happened a most recent read miss for the block, and no other processor module has the block in either MODIFIED-SHARED or MODIFIED state. SHARED state further denotes that the block is not in any of the above described states but only in valid state.

In accordance with the preferred embodiment of the present invention, the processor module which has the block in any of MODIFIED-SHARED, MODIFIED, EXCLUSIVE and SHARED-SOURCE states becomes the owner of the block, and, therefore, must respond to an access request for the block sent by another processor module in the shared memory multiprocessor.

Figure 5:
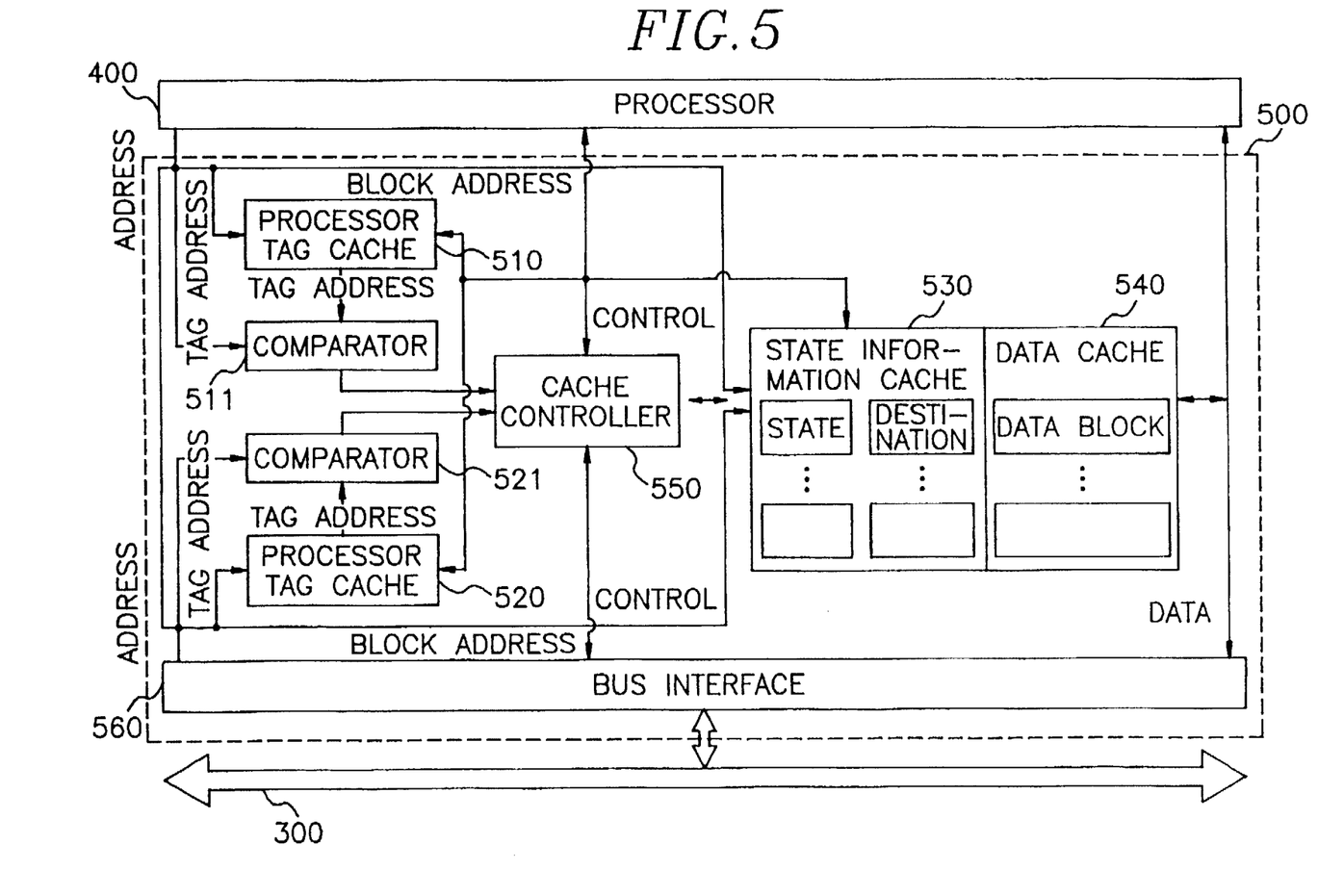
FIG. 5 presents a block diagram illustrating the write-invalidate cache system of the present invention.

Turning now to FIG. 5, an exemplary implementation of the cache 500 of the present invention is illustrated in a block diagram form. As shown in FIG. 5, the cache 500 includes a processor tag cache 510 and a bus monitor tag cache 520, each of which holds the tag addresses of the cache blocks stored in the cache 500; two comparators 511, 521 respectively coupled to the processor tag cache 510 and the bus monitor tag cache 520; a state information cache 530 which holds, per a cache block, state information indicating one of the seven cache block states as explained above; a data cache 540 which holds the cache blocks; a cache controller 550; and a bus interface 560 which, under the control of the cache controller 550, interfaces the processor 400 and the cache 500 with the system bus 300.

When the processor 400 sends to the cache 500 an access request for a block along with the physical address thereof, a portion of the physical address labelled "block address" indexes the cache logic unit 510, 530 and 540. The comparator 511 has an input supplied from processor tag cache 510 and another input supplied from another portion of the physical address labelled "tag address". A match within the comparator 511 indicates the cache 500 has the requested block.

Bus watching (i.e., snooping) operation is achieved with the bus monitor tag cache 520 so that bus watching lookups can proceed in parallel with the processor's cache accesses. Specifically, when a bus-oriented command arrives at the cache 500 along with the physical address of the desired block, the "block address" of the physical address indexes the bus monitor tag cache 520, state information cache 530 and data cache 540. The comparator 521 has an input supplied from the bus monitor tag cache 520 and another input supplied from the "tag address" of the physical address. A mach within the comparator 521 indicates the cache 500 has the desired block.

The cache controller 550, in response to the access request from the processor 400 and/or a bus-oriented command from the processor 300, identifies the result of the comparators 511, 521, examines/modifies the state information for that block, and further examines/drives COMMAND lines, VALID line, DIRTY line, MEMORY-INHIBIT line, SOURCE-ID lines and DESTINATION-ID lines, etc. of the system bus 300 as will be explained below, and controls/synchronizes the overall operation of the cache 500.

Referring back to FIG. 4, the communications between modules of the shared memory multiprocessor are achieved through the system bus 300. The system bus 300 comprises 3 separate buses, i.e., an address bus, a data bus and a control bus, and operates under the split transaction protocol described above. The control bus, in turn, comprises COMMAND, VALID, DIRTY, MEMORY-INHIBIT, SOURCE-ID, DESTINATION-ID lines, etc.

COMMAND lines carry among the memory module 100 and the processor modules 200, 200' various bus-oriented commands including, e.g., a broadcast read request, a cache-to-caches read request, an invalidation request, a broadcast read with invalidation request and a cache-to-caches read with invalidation request, etc. which will be described in more detail hereinbelow.

VALID, DIRTY and MEMORY-INHIBIT lines are used for the broadcast read (with invalidation) request. For example, when the processor module, e.g., 200, as a result of a cache miss for a block, issues a broadcast read request to the memory module 100 and other processor modules; e.g., 200', the other processor modules, e.g., 200', assert signals on VALID, DIRTY and MEMORY-INHIBIT lines depending on their respective state information for that block. Then, the requesting processor module 200 can recognize by examining VALID line whether there exists the block in any of EXCLUSIVE, SHARED-SOURCE and SHARED states in any other processor module, e.g., 200', and by examining DIRTY line whether there exists the block in either MODIFIED-SHARED or MODIFIED state in any other processor module, e.g., 200'. Further, the memory module 100 by examining MEMORY-INHIBIT line can stop responding to the broadcast read request when MEMORY-INHIBIT signal is asserted on MEMORY-INHIBIT line.

SOURCE-ID lines may be used for identifying the source processor module which originates a command (e.g., a broadcast read (with invalidation) request, an invalidation request, etc.) or a response. DESTINATION-ID lines may be used for identifying the destination processor module which will receive the command or the response.

Figure 6A:
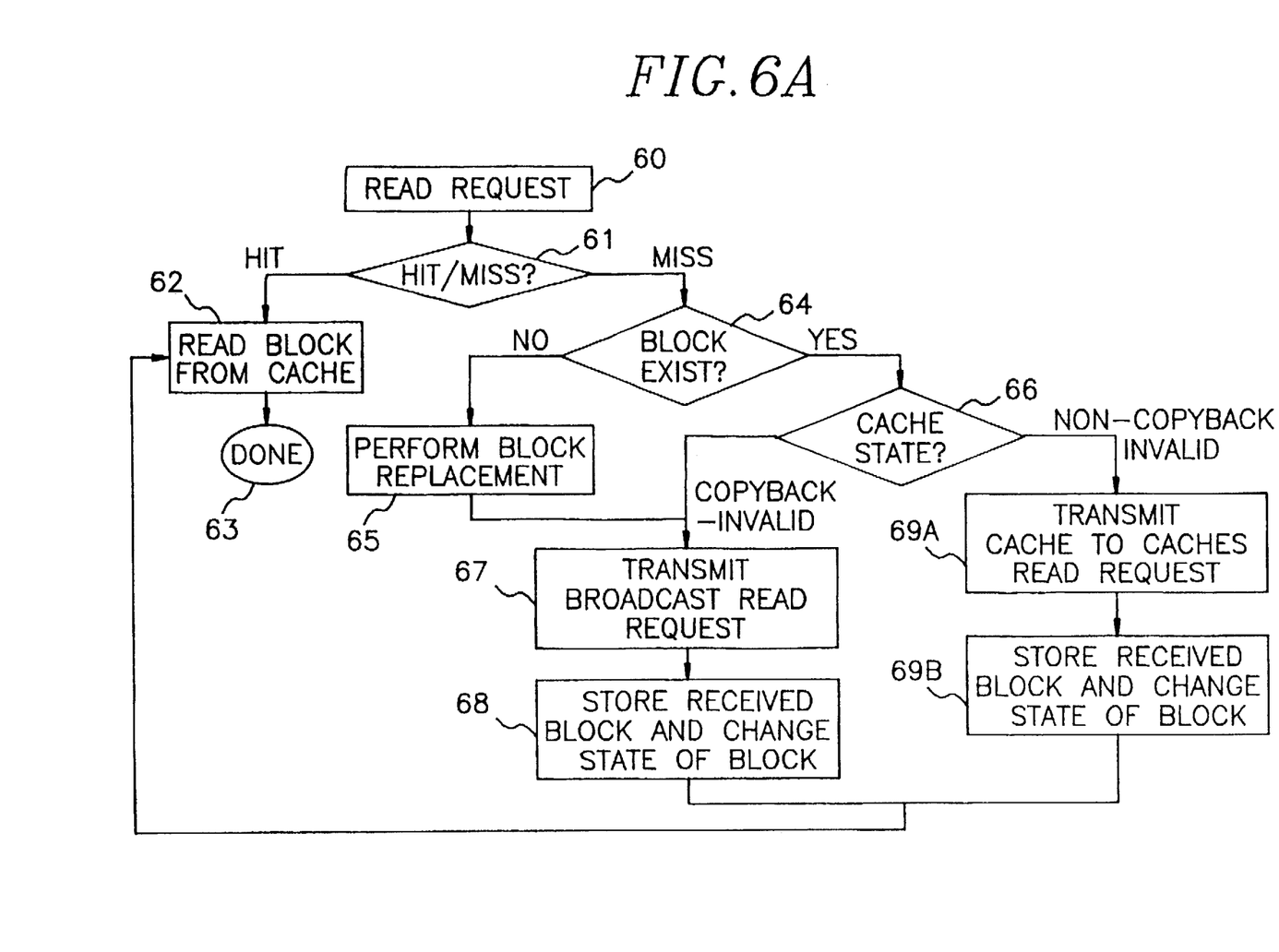
FIGS. 6A and 6B demonstrate the access request operations of the processor modules in accordance with the preferred embodiment of the present invention.
Figure 6B:
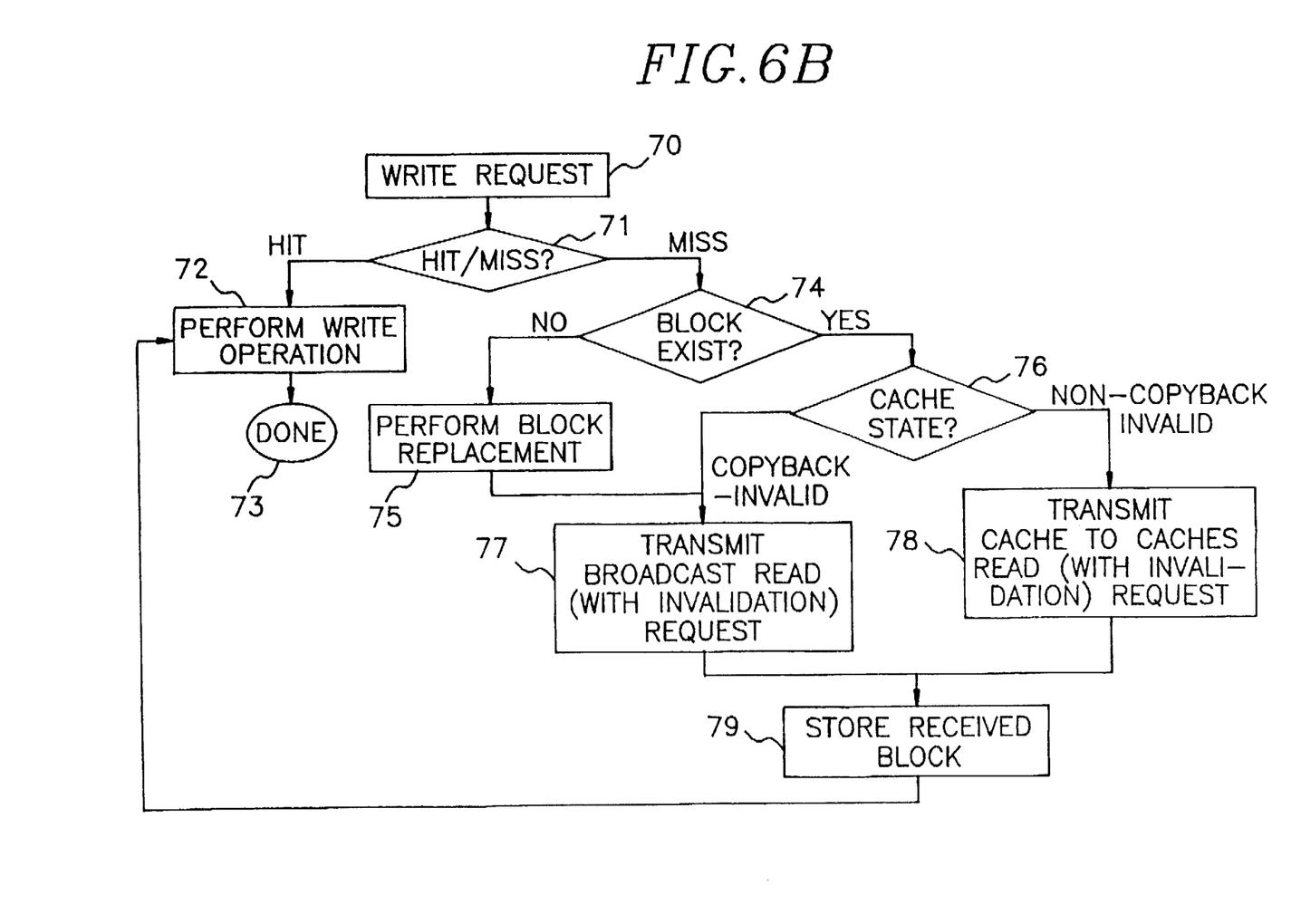

Referring to FIGS. 6A and 6B, there are shown the exemplary access request operations of the processor modules 200, 200' which comprise the cache 500, 500' in accordance with the preferred embodiment of the present invention. The access request operations include a read request operation and a write request operation to the cache 500 which will be described for each case of Read-hit, Read-miss, Write-hit, and Write-miss.

As shown in FIG. 6A, when a processor 400 within a processor module 200 issues a read request to the cache 500 for an access to a block of data at step 60, it is tested at a next step 61 whether Read-hit or Read-miss occurs in the cache 500. Read-hit represents the case where the cache 500 within the processor module 200 has the read-requested block in any of MODIFIED-SHARED, MODIFIED, EXCLUSIVE, SHARED-SOURCE and SHARED state. On the other hand, Read-miss represents the case where the cache 500 within the processor module 200 does not contain the read-requested block, or it has the read-requested block either in COPYBACK-INVALID or NON-COPYBACK-INVALID state.

For a Read-hit case, the process passes from step 61 to steps 62 and 63, wherein the cache 500 passes the read-requested data block to the processor 400.

For a Read-miss case, the process goes from step 61 to step 6 and it is tested therein whether or not the cache 500 within the processor module 200 contains the read-requested block.

If the cache 500 does not contains the read-requested block, in a next step 65, the processor module 200 performs the block replacement and then sends a broadcast read request to the memory module 100 and other processor modules, e.g., 200'. Hereinafter, we shall refer to the block replacement as a process wherein a processor module copies back the block to the corresponding memory module when a cache miss for a requested block occurs in its private cache and a block to replace the requested block is in either MODIFIED-SHARED or MODIFIED state in its private cache, and then signals, via, e.g., COMMAND lines, all other processor modules which may hold the block in NON-COPYBACK-INVALID state in their caches to change the states of their copies of the block from NON-COPYBACK-INVALID to COPYBACK-INVALID. Thereafter, the process goes to step 67.

If the cache 500 contains the read-requested block, in step 66, it is tested if the read-requested block is in COPYBACK-INVALID or NON-COPYBACK-INVALID state. If the cache 500 holds the read-requested block in COPYBACK-INVALID state, the process passes to step 67, wherein the processor module 200 issues a broadcast read request to the memory module 100 and other processor modules, e.g., 200' without the block replacement described in step 65 and send the process to step 68. In this case, if one of the other processor modules, e.g., 200' has the block in EXCLUSIVE or SHARED-SOURCE state, it asserts signals on VALID and MEMORY-INHIBIT lines, and responds to the request with its copy of the block, and changes the state of its copy into SHARED state. If one of the other processor modules, e.g., 200' has the block either in MODIFIED-SHARED or MODIFIED state, it affirms signals on DIRTY and MEMORY-INHIBIT lines, and responds to the request with its copy of the block, and maintains/changes the state of its copy in/into MODIFIED-SHARED state. If any other processor module, e.g., 200' has the block in SHARED state, it asserts a signal on VALID line. On the other hand, the memory module 100 responds to the request with the copy of the block so far as MEMORY-INHIBIT signal under observation is not asserted.

In step 68, when the requesting processor module 200 receives the valid copy of the block from either the memory module 100 or one of the other processor modules, e.g., 200', the valid copy of the block is stored in the cache 500 and then changes by examining both VALID and DIRTY lines the state of the block as follows: when DIRTY signal is affirmed, it changes the state into SHARED state; when VALID signal is asserted but DIRTY signal is not asserted, it changes the state into SHARED-SOURCE state; and when neither DIRTY signal nor VALID signal is asserted, it changes the state into EXCLUSIVE state. Thereafter, the process returns to step 62 which performs the read operation for the block.

If, however, the cache 500 in the processor module 200 is found to have the block in NON-COPYBACK-INVALID state at step 66, in a next step 69A, the requesting processor module 200 issues a cache-to-caches read request to other processor modules, e.g., 200' only (instead of sending a broadcast read request to the memory module 100 and other processor modules, e.g., 200' as in conventional cache coherence schemes) and send the process to step 69B.

In this case, the processor module, e.g., 200' which has invalidated the block most recently and, therefore, contains in its cache 500' the block in either MODIFIED or MODIFIED-SHARED state responds to the cache-to-caches read request by sending its updated copy of the block to the processor module 200, and maintains/changes the state of its updated copy in/into MODIFIED-SHARED state.

When the requesting processor module 200 receives the valid copy at the step 69B, the received valid copy is stored in the cache 500, changes the state of the block into SHARED state and then the process returns to step 62 which performs the read operation for the block.

Referring to FIG. 6B, there is shown the write request operation of the processor module 200. In step 70, when a processor 400 within a processor module 200 issues a write request to the cache 500 for an access to a block, in a next step 71, it is tested whether Write-hit or Write-miss occurs in the cache 500. Write-hit represents the case where the cache 500 within the processor module 200 has the write-requested block in any of MODIFIED-SHARED, MODIFIED, EXCLUSIVE, SHARED-SOURCE or SHARED state. On the other hand, Write-miss represents the case where the cache 500 within the processor module 200 does not contain the write-requested block, or it has the write-requested block either in COPYBACK-INVALID or NON-COPYBACK-INVALID state. If read-hit occurs, the process passes to steps 72 and 73, wherein a write operation is performed.

The write operation includes two write operations, i.e., a first and a second write operations which are selectively executed. In the first write operation, if the cache 500 has the block in MODIFIED state, the processor module 200 writes a modified block on the prestored block. On the other hand, in the second write operation, if the cache 500 has the block in any of MODIFIED-SHARED, SHARED-SOURCE and SHARED states, the processor modules 200 sends an invalidation request to other processor modules, e.g. 200', causing all the other processor modules, e.g., 200' to change the state of their copies into NON-COPYBACK-INVALID state and, after all the copies have been invalidated, the requesting processor module 200 performs the write operation for the block, and then changes the state of the block into MODIFIED state.

If Write-miss occurs at step 70, the process goes to step 74 and it is tested therein whether or not the cache 500 within the processor module 200 contains the write-requested block.

If the write-requested block is not contained in the cache 500, the process goes to step 75 where the processor module 200 performs the block replacement, and then to step 77 in order to send a broadcast read with invalidation request to the memory module 100 and other processor modules, e.g., 200'.

If the write-requested block is contained in the cache 500, the process passes to step 76, wherein it is tested if the write-requested block is in COPYBACK-INVALID or NON-COPYBACK-INVALID state.

If the cache 500 is found to have the block in COPYBACK-INVALID state at step 76, the processor module 200 issues a broadcast write with invalidation request at step 77 to the memory module 100 and other processor modules, e.g., 200' without the block replacement in step 75 and then sends the process to step 79.

In this case, if one of the other processor modules, e.g., 200' has the block in any of MODIFIED, MODIFIED-SHARED, EXCLUSIVE and SHARED-SOURCE states, it asserts a signal on MEMORY-INHIBIT line, and responds to the request with its copy of the block, and changes the state of its copy into NON-COPYBACK-INVALID state. If any other processor module, e.g., 200' has the block in any of SHARED, NON-COPYBACK-INVALID and COPYBACK-INVALID states, it maintains/changes the state of its copy of the block in/into NON-COPYBACK-INVALID state.

On the other hand, the memory module 100 responds to the request with its copy of the block so far as MEMORY-INHIBIT signal under observation is not asserted.

If, however, the cache 500 in the processor module 200 has the block in NON-COPYBACK-INVALID state, the process goes to step 78, wherein the processor module 200 sends a cache-to-caches read with invalidation request to other processor modules, e.g., 200' only (instead of sending a broadcast read with invalidation request to the memory module 100 and other processor modules, e.g., 200' as in conventional write-invalidate cache coherence schemes), and then to step 79.

In this case, the processor module, e.g., 200' which has invalidated the block most recently and, therefore, contains in its cache 500' the block in either MODIFIED-SHARED or MODIFIED state responds to the cache-to-caches read with invalidation request by sending its updated copy of the block to the processor module 200, and changes the state of its updated copy into NON-COPYBACK-INVALID state. If any other processor module in the shared memory multiprocessor has the block too, it changes, in response to the cache-to-caches read with invalidation request, the state of its copy of the block into NON-COPYBACK-INVALID state.

In step 79, when the requesting processor module 200 receives the valid copy of the block from either the memory module 100 or one of the processor modules, e.g., 200', the cache 500 stores the valid copy of the block. Thereafter, the process returns to steps 72 and 73 where the processor 200 performs the write operation for the block and then changes the state of the block into MODIFIED state.

In accordance with another embodiment of the present invention, the cache-to-caches read request processing can be replaced with a cache-to-cache read request processing if the requesting processor module maintains identification information of the processor module which has invalidated the block most recently (i.e., the processor module which contains an updated copy of the block in its private cache). To this end, the caches 500, 500', in accordance with another preferred embodiment of the present invention, maintain, in their state information caches, one additional field for each block: a destination identification field (DESTINATION-ID) identifying the processor module which has invalidated the block most recently.

Referring back to FIG. 6A, in accordance with another embodiment of the present invention, the step 69A is changed as follows: the processor module 200 sends a cache-to-cache read request only to the processor module, e.g., 200' as indicated by the DESTINATION-ID of the block (recall that the DESTINATION-ID identifies the processor module which has invalidated the block most recently and, therefore, contains in its cache 500' the block in either MODIFIED-SHARED or MODIFIED state).

In this case, the processor module 200' responds to the cache-to-cache read request by sending its updated copy of the block to the processor module 200 and maintains/changes the state of its updated copy in/into MODIFIED-SHARED state.

On the other hand, in step 72 shown in FIG. 6B, if the cache 500 has the block in any of MODIFIED-SHARED, SHARED-SOURCE and SHARED states, the processor modules 200 sends an invalidation request to other processor modules, e.g. 200', causing all other processor modules, e.g., 200' to change the state of their copies into NON-COPYBACK-INVALID state, and update the DESTINATION-IDs of their copies to indicate the processor module 200. After all the copies have been invalidated, the processor module 200 performs the write operation for the block, and then changes the state of the block into MODIFIED state.

In step 77, the processor module 200 sends a broadcast read with invalidation request to the memory module 100 and other processor modules, e.g., 200' without the block replacement.

In this case, if the one of the other processor modules, e.g., 200' has the block in any of MODIFIED, MODIFIED-SHARED, EXCLUSIVE and SHARED-SOURCE states, it asserts a signal on MEMORY-INHIBIT line; responds to the request with its copy of the block; changes the state of its copy into NON-COPYBACK-INVALID state; and replaces the DESTINATION-ID indicating the processor module 200. If any other processor module, e.g., 200' has a copy of the block in any of SHARED, NON-COPYBACK-INVALID and COPYBACK-INVALID states, it maintains/changes the state of its copy of the block in/into NON-COPYBACK-INVALID state, and replaces the DESTINATION-ID of its copy with the new DESTINATION-ID.

In step 78, the processor module 200 sends a cache-to-cache read with invalidation request to other processor module, e.g., 200'. In this case, the processor module, e.g., 200' as indicated by the DESTINATION-ID of block responds to the cache-to-cache read with invalidation request by sending its copy of the block to the processor module 200, and changes the state of its updated copy into NON-COPYBACK-INVALID state, and replaces the DESTINATION-ID of its copy with a new DESTINATION-ID indicating the processor module 200.

As may be seen from the above, the inventive write-invalidate cache system of the present invention is utilized for eliminating unnecessary memory accesses in a split transaction bus based shared memory multiprocessor. In the shared memory multiprocessor, maintaining two distinct invalidate cache block states of COPYBACK-INVALID state and NON-COPYBACK-INVALID state in its private cache, a processor module can recognize, when an invalidation miss for a block occurs in the processor module, whether or not an updated copy of the block exists in the corresponding memory module. Thus, when an invalidation miss occurs and it is recognized that the updated copy of the block does not exist in the corresponding memory module, the processor module sends a cache-to-cache(s) read (with invalidation) request to other processor modules only, eliminating unnecessary memory access. This results in a reduced effective memory access time, and, hence, accomplishes a better multiprocessor performance.

While the present invention has been and described with reference to the particular embodiments, it will be apparent to those skilled in the art that many changes and modification may be made without departing from the spirit and scope of the invention as defined in the appended claims. For example, each processor module in FIG. 4 may further comprises a number of hierarchically organized caches in addition to the depicted cache. Further, said at least one memory module in FIG. 4 may be distributed among the processor modules.

What is claimed is:

1. A shared memory multiprocessor having a system bus operating under a split transaction protocol, at least one memory module coupled to the system bus and a plurality of processor modules respectively coupled to the system bus, each of the processor modules comprising:

a processor;

a cache coupled between the processor and the system bus for storing a number of data blocks;

a state information storage associated with the cache, for storing a number of cache block states, each cache block state denoting the current state of each of data blocks stored in the cache and the cache block states including:

a first invalid state in which the data block to be accessed is most recently invalidated by another processor module and the updated copy of the data block has not been copied back to the memory module; and a second invalid state in which the data block to be accessed has been invalidated by another processor module and the updated copy of the block of data has been copied back to the memory module;

means, upon receiving an access request from the processor for a data block, for accessing the updated copy of the access requested data block in other processor modules by sending a cache-to-caches access request via the system bus to other processor modules, when the access requested data block is in the first invalid state, to thereby prevent the memory module responding to the cache-to-caches access request; and means, upon receiving an access request from the processor for a data block, for accessing the updated copy of the access requested data block in other processor modules by sending a broadcast access request via the system bus to other processor modules and the memory module when the access requested data block is in the second invalid state.

2. The shared memory multiprocessor of claim 1, wherein the cache block states further includes a third invalid state in which the data block to be accessed is not in the cache and the processor module further comprises means, upon receiving an access request from the processor for a data block, for performing a block replacement process to send the broadcast read request via the system bus to other processor modules and the memory module.

3. The shared memory multiprocessor of claim 2, wherein the cache block states further includes:

a first valid state in which the data block to be accessed has been modified; the data block to be accessed is inconsistent with that in the memory; and no other processor module has a copy of the data block in a valid state;

a second valid state in which the data block to be accessed is consistent with that in the memory module; and a third valid state in which the data block to be accessed is consistent with that in the memory and no other processor module has the data block in the first valid state.

4. The shared memory multiprocessor of claim 3, wherein the processor module further comprises means, in response to the broadcast access request, for sending a memory inhibit signal for use in preventing the memory from responding to the broadcast access request, and then for providing the requested data block in one of the valid states.

5. The shared memory multiprocessor of claim 4, wherein the first invalid state includes destination information denoting said another processor module which has recently invalidated the data block to be accessed and wherein the processor module further comprises means, upon receiving an access request from the processor for a data block, for accessing the updated copy of the requested data block to be accessed in the destination processor module by sending a cache-to-cache access request via the system bus to the destination processor module designated by the destination information when the access requested data block is in the first invalid state.

6. The shared memory multiprocessor of claim 1, wherein the cache includes:

a data cache for storing the data blocks;

a processor tag cache for storing tag addresses of physical addresses of the data blocks; and a comparator for comparing, upon receiving an access request for a data block from the processor, a tag address of a physical address of the data block with one of the tag addresses from the processor tag caches accessed by a block address of the physical address of the data block.

7. The shared memory multiprocessor of claim 6, wherein the cache further includes:

a bus monitor tag cache for storing the tag addresses; and a second comparator for comparing, upon receiving an access request for a desired block of data from one of processor modules, a tag address of a physical address of the desired data block with one of the tag addresses from the bus monitor tag caches accessed by a block address of the physical address of the desired data block.

8. The shared memory multiprocessor of claim 7, wherein the processor includes an internal cache.

9. The shared memory multiprocessor of claim 1, wherein said each of the processor modules further comprises a predetermined number of hierarchical caches.

10. The shared memory multiprocessor of claim 1, wherein said plurality of the processor modules is implemented by a preselected number of physical modules, said preselected number being equal to or smaller than the number of the processor modules.

11. The shared memory multiprocessor of claim 1, wherein said at least one memory module is distributed among said plurality of the processor modules.

12. The shared memory multiprocessor of claim 1, wherein the system bus containing an address bus, a data bus and a control bus provides communications among said at least one memory module and said plurality of the processor modules.

13. A method for controlling the cache coherence in a shared memory multiprocessor having a system bus operating under a split transaction protocol, wherein at least one memory module coupled to the system bus and a plurality of processor modules respectively coupled to the system bus, each of the processor modules having a cache memory, comprising the steps of:

(a) managing data blocks in the cache memories by using cache block states for denoting each data block stored in the cache memories, the cache block states containing:

a first invalid state in which the data block to be accessed is most recently invalidated by another processor module and the updated copy of the data block has not copied back to the memory module; and a second invalidate state in which the data block to be accessed has been invalidated by another processor module and the updated copy of the block of data has copied back to the memory module;

(b) upon receiving an access request from the processor for a data block, accessing the updated copy of the access requested data block in other processor modules by sending a cache-to-caches access request via the system bus to other processor modules when the access requested data block is in the first invalid state, the memory module not responding to the cache-to-caches access request; and (c) upon receiving an access request from the processor for a data block, accessing the updated copy of the access requested data block in other processor modules by sending a broadcast access request via the system bus to other processor modules and the memory module when the access requested data block is in the second invalid state.

14. The method of claim 13, wherein the block states further includes a third invalid state in which the data block to be accessed is not in the cache; and further comprising the step (d) of, upon receiving an access request from the processor for a data block, performing a block replacement process for the memory module to send the broadcast read request via the system bus to other processor modules and the memory module.

15. The method of claim 14, wherein the block states further includes:

a first valid state in which the data block to be accessed has been modified; the data block to be accessed is in inconsistent with that in the memory; and no other processor module has a copy of the data block in a valid state;

a second valid state in which the data block to be accessed is consistent with that in the memory module; and a third valid state in which the data block to be accessed is consistent with that in the memory and no other processor module has the block in the first valid state.

16. The method of claim 15, wherein the step (d) includes the step of, upon receiving the broadcast access request, sending a memory inhibit signal for use in prohibiting the memory responding to the broadcast request to provide the requested data block in one of the valid states.

17. The method of claim 16, wherein the first invalid state includes destination information denoting said another processor module which has recently invalidated the data block to be accessed and the step (b) includes the step of, upon receiving an access request from the processor for a data block, accessing the updated copy of the access requested data block in the destination processor module by sending a cache-to-cache access request via the system bus to the destination processor module designated by the destination information when the access requested data block is in the first invalid state.

* * * * *